United States Patent Office 2,697,106
Patented Dec. 14, 1954

2,697,106

SELECTIVE REDUCTION OF 3 KETO $\Delta^{4,6}$ STEROIDS

Douglas A. Shepherd, J Allan Campbell, and Byron A. Johnson, Kalamazoo, Mich., assignors to The Upjohn Company, Kalamazoo, Mich., a corporation of Michigan No Drawing. Application May 13, 1952,
Serial No. 287,611

13 Claims. (Cl. 260—397.2)

The present invention relates to a novel and useful chemical process for the conversion of $\Delta^{4,6}$-3-ketosteroids to $\Delta^4$-3-ketosteroids by selective hydrogenation of the six-double bond.

It is an object of this invention to provide a novel and useful process for the production, in high yields, of steroids containing the $\Delta^4$-3-keto grouping, a grouping which is an essential part of the steroid nucleus in most steroid hormones. Such physiologically active steroid hormones as 11-desoxycorticosterone, cortisone, progesterone, testosterone, and others, contain a $\Delta^4$-3-ketosteroid grouping as an integral part of the steroid nucleus, and may be produced by the process of this invention. Other compounds produced by the process of this invention may be converted to physiologically active compounds. Illustratively, 4,22-ergostadien-3-one may be converted to 3-keto-bisnor-4-cholenaldehyde by ozonization of the 22-double bond followed by decomposition of the ozonide with zinc and acetic acid. The resulting 3-keto-bisnor-4-cholenaldehyde may be converted to progesterone by known procedure [Heyl and Herr, J. Am. Chem. Soc., 72, 2617 (1950); Heyl and Herr, copending application Serial Number 111,098, filed August 18, 1949, now Patent 2,601,287]. Other objects and uses of this invention will be apparent to those skilled in the art to which this invention pertains.

Conversion of a $\Delta^{4,6}$-3-ketosteroid to a $\Delta^4$-3-ketosteroid by catalytic hydrogenation is known in the art. 4,6,22-ergostatrien-3-one has been reduced with hydrogen in the presence of a platinum catalyst to obtain a product which contained 4,22-ergostadien-3-one, along with two forms of 22-ergosten-3-one, two forms of 22-ergosten-3-ol, 22-ergostene, and other compounds, as well as the starting triene, as a difficultly separable mixture [Barton, Cox, Holness, J. Chem. Soc., 1771 (1949)]. Undoubtedly the yield of crude and isolated 4,22-ergostadien-3-one, as well as the crude and isolated yields of the other compounds in the product, was relatively low because the reduction was not selective and gave a complex mixture requiring chromatographic adsorption methods for separation. In contrast, the present invention provides a highly selective method for the catalytic hydrogenation of the double bond in the six-position of a $\Delta^{4,6}$-3-ketosteroid, the resulting $\Delta^4$-3-ketosteroid being isolated from the crude product by simple procedure, such as recrystallization, and obtained in high yield.

According to the process of the present invention, the six-double bond in a $\Delta^{4,6}$-3-ketosteroid, admixed with a solvent, is selectively hydrogenated, using from between about 0.9 to about 1.2 mole of hydrogen per mole of steroid, in the presence of a palladium catalyst, to obtain a $\Delta^4$-3-ketosteroid in high yield.

In carrying out the process of the present invention, a palladium catalyst is admixed with a solvent, such as, for example, ethyl acetate, methyl alcohol, ethyl alcohol, isopropyl alcohol, dioxane, tetrahydrofuran, and the like, the concept, definition, and use of a solvent being well known in the art. Ordinarily it is preferred to include a small amount of a base in the admixture if the starting steroid and the steroid product are essentially non-reactive with the base. If a base is used, methanol or a methanol-dioxane mixture is usually the preferred solvent. If a base is not included, ethyl acetate is frequently the preferred solvent. Normally anhydrous solvents are used; however, the presence of water usually does not lower the yield of product. The preferred solvent in any particular instance depends in part on the solubility of the starting steroid and the steroid product, the inclusion or exclusion of a base, and the temperature at which the reaction is conducted. Illustrative of the bases which may be used are the alkali-metal hydroxides, with sodium hydroxide and potassium hydroxide being preferred. Preferably between about 0.1 gram and about one gram of alkali-metal hydroxide is used per liter of solvent, higher and lower concentrations also usually being operative. The admixing of catalyst, solvent, and base, if present, may be done in any order. The preferred catalyst is a palladium-charcoal catalyst. However, other palladium catalysts, such as, for example, palladium-barium sulfate, palladium-barium carbonate, and others, are suitable. Ordinarily a five per cent palladium-charcoal catalyst is used; however, a palladium-charcoal catalyst containing 0.1 per cent palladium, or even less, or ten per cent palladium, or even more, also gives excellent results.

Normally the palladium catalyst is prereduced by agitating the admixture of catalyst and solvent, with or without added base, with hydrogen until hydrogen ceases to react. Then the resulting admixture containing the prereduced catalyst is admixed, in either order of addition, with the starting $\Delta^{4,6}$-3-ketosteroid, usually previously admixed with the same solvent as that present in the catalyst admixture. Then, with agitation, hydrogen is introduced until between about 0.9 and about 1.2 moles of hydrogen per mole of steroid has reacted, the selective reduction being very rapid. In some instances high yields of the desired product are obtained by admixing the solvent, the catalyst without prereduction, and the starting steroid, with or without added base, the components being admixed in any order, and then agitating the resulting admixture with hydrogen. The process is usually carried out at about room temperature, however higher and lower temperatures are operative. The hydrogen is usually introduced at an absolute pressure of from between about one and about 1.5 atmospheres, i. e., at a pressure from between about equal to and about 0.5 atmosphere above standard atmospheric pressure, but lower pressures and considerably higher pressures may be employed if desired. Agitation may be by shaking, stirring, or other conventional agitation method. Usually the six-double bond is also reduced selectively in the presence of easily reducible groups or unsaturated linkages other than the four-double bond and the three-keto group. Illustratively, only the six-double bond of 4,6,22-ergostatrien-3-one is reduced, the 22-double bond, as well as the three-keto group and the four-double bond, being unaffected. If a $\Delta^{4,6}$-3-ketosteroid contains an additional group or unsaturated linkage which is more readily reduced than the six-double bond, a $\Delta^4$-3-ketosteroid, in which the additional group or unsaturated linkage also has been reduced, may be obtained by using the amount of hydrogen necessary to reduce the additional group or unsaturated linkage, in addition to the amount of hydrogen already specified for the reduction of the six-double bond.

After the reaction is complete, the crude product may be isolated in approximately a theoretical yield by simple procedure, such as, for example, filtration to remove the catalyst, acidification of the resulting filtrate with acid, illustratively acetic acid, if base was used in the reaction, followed by filtration of the acidified solution to remove any insoluble salt formed on acidification, and distillation of the solvent from the resulting filtrate to obtain the isolated crude product.

The pure $\Delta^4$-3-ketosteroid is obtained in high yield from the isolated crude product, if desired, by simple procedure, such as, for example, recrystallization from a suitable solvent. More elaborate procedure, such as, for example, chromatographic adsorption methods, may be used, but are not required to obtain a high yield of pure product. If the product is to be used in a subsequent reaction, it is sometimes preferred not to purify the crude product since it is frequently of sufficient purity to be used as starting material for the subsequent reactions.

The following examples are illustrative of the novel selective hydrogenation processes of the present invention, but are not to be construed as limiting.

Example 1.—4,22-ergostadien-3-one

A solution of 1.4 grams of potassium hydroxide (Reagent Grade, 85%) dissolved in two liters of anhydrous methanol is admixed with a slurry of two grams of five per cent palladium-charcoal catalyst suspended in 800 milliliters of anhydrous methanol, in a 2.5 gallon cylindrical bottle. With vigorous stirring hydrogen is introduced at one to 1.5 atmospheres pressure to reduce the catalyst. Then a warm solution of 25.0 grams of 4,6,22-ergostatrien-3-one [Wetter and Dimroth, Ber., 70, 1665 (1937)], melting point 107–109 degrees centigrade, dissolved in 950 milliliters of methanol is added. To the resulting admixture 1.0 to 1.1 mole equivalents of hydrogen is introduced at about one to 1.5 atmospheres pressure using vigorous stirring, the reaction being very rapid. When the selective hydrogenation reaction is complete, the catalyst is removed by filtration, the filtrate acidified with two milliliters of acetic acid, and the solvent distilled under reduced pressure. The resulting solid residue, almost the theoretical amount, containing 85 per cent of the desired 4,22-ergostadien-3-one and only a trace of the starting 4,6,22-ergostatrien-3-one, as determined by ultraviolet light absorption analysis, is extracted with 135 milliliters of hot ethyl acetate. The insoluble potassium acetate is removed by filtration, and the filtrate is allowed to cool at room temperature and finally refrigerated. The crystalline product which precipitates from the filtrate is removed by filtration and recrystallized twice from thirty-milliliter portions of ethyl acetate. The yield of pure 4,22-ergostadien-3-one, melting at 128–132 degrees, centigrade, $[\alpha]_D^{24} = +43$ degrees in chloroform, is 17.5 grams or 70 per cent of the theoretical amount. The infrared light absorption spectra is consistent with the assigned structure of the product, the presence of a conjugated keto-monoloefin group and the absence of a hydroxyl group being indicated.

Analysis: Calculated for $C_{28}H_{44}O$: C, 84.79; H, 11.17. Found: C, 85.04; H, 11.04.

Example 2.—4,22-ergostadien-3-one

Using a Parr hydrogenation apparatus equipped with an auxiliary mercury manometer, eighty milligrams of five per cent palladium-charcoal catalyst, suspended in 120 milliliters of anhydrous methanol containing ten milligrams of potassium hydroxide (Reagent Grade, 85%), is shaken with hydrogen at a pressure of about one to two atmospheres to reduce the catalyst. Then a solution of one gram $(2.54 \times 10^{-3}$ mole) of 4,6,22-ergostatrien-3-one dissolved in thirty milliliters of hot anhydrous methanol is added. The resulting reaction mixture is allowed to cool to room temperature, and then, with shaking, hydrogen is introduced at a pressure of from one to two atmospheres pressure until $2.54 \times 10^{-3}$ mole of hydrogen has reacted selectively. The catalyst then is removed by filtration, the filtrate acidified with 0.5 milliliter of glacial acetic acid, and the solvent removed by distillation under reduced pressure. The resulting residual solid, nearly the theoretical amount, is extracted with ether, the insoluble potassium acetate being removed by filtration. Distillation of the ether from the filtrate gives a crude product containing eighty per cent of 4,22-ergostadien-3-one as determined by ultraviolet light absorption analysis. The crude product is dissolved in Skellysolve B and transferred to a chromatographic column containing synthetic magnesium silicate. Elution using a one per cent solution of acetone in Skellysolve B gives a 73 per cent yield of 98 per cent pure 4,22-ergostadien-3-one, the purity being determined by ultraviolet light absorption analysis.

Example 3.—4,22-ergostadien-3-one

Using the apparatus and general procedure described in Example 2, 0.5 gram $(1.27 \times 10^{-3}$ mole) of 4,6,22-ergostatrien-3-one, dissolved in 150 milliliters of ethyl acetate, is allowed to react selectively with approximately 1.2 mole equivalent of hydrogen in the presence of two grams of 0.1 per cent palladium-charcoal catalyst. The crude product, approximately the theoretical amount, contains 73 per cent of the desired 4,22-ergostadien-3-one and none of the starting triene, as determined by ultraviolet light absorption analysis. The product is purified by recrystallization or chromatography as in previous examples.

Example 4.—4,22-ergostadien-3-one

Following the general procedure described in Example 2, 2.5 grams $(6.35 \times 10^{-3}$ mole) of 4,6,22-ergostatrien-3-one, dissolved in 150 milliliters of ethyl acetate, is hydrogenated selectively with approximately one molar equivalent of hydrogen in the presence of 0.1 gram of five per cent palladium-charcoal catalyst. The crude product, almost the theoretical weight, contains 71 per cent of the desired 4,22-ergostadien-3-one and four per cent of the starting 4,6,22-ergostatrien-3-one, as determined by ultraviolet light absorption analysis. The diene is purified by recrystallization or chromatography as in previous examples.

Example 5.—4,22-ergostadien-3-one

Using the apparatus and method of Example 2, one gram $(2.54 \times 10^{-3}$ mole) of 4,6,22-ergostatrien-3-one, dissolved in a solution containing 100 milliliters of methanol, 100 milliliters of dioxane, and one pellet of potassium hydroxide (approximately 0.15 gram), is reduced selectively with approximately one mole equivalent of hydrogen in the presence of 0.05 gram of five per cent palladium-charcoal catalyst. The crude product, nearly the theoretical amount, contains 75 per cent of the desired 4,22-ergostadien-3-one and ten per cent of the starting triene. Recrystallization or chromatographic adsorption methods give pure diene as described in previous examples.

Example 6.—4,22-ergostadien-3-one

Using the method of Example 2, five grams of 4,6,22-ergostatrien-3-one, dissolved in a solution containing 100 milliliters of methanol, 100 milliliters of dioxane, and one pellet of potassium hydroxide (approximately 0.15 gram), is reduced selectively with one molar equivalent of hydrogen in the presence of 0.18 gram of five per cent palladium-charcoal catalyst. The crude product, about the theoretical quantity, contains 82.5 per cent of the desired 4,22-ergostadien-3-one and eleven per cent of the starting triene. Purification is accomplished as in previous examples.

Example 7.—4,22-ergostadiene-3-one

Following the procedure of Example 2, one gram of 4,6,22-ergostatrien-3-one, dissolved in 200 milliliters of methanol, is reduced selectively with one mole equivalent of hydrogen using eighty milligrams of five per cent palladium-charcoal catalyst. The crude product, nearly the theoretical amount, contains 65 per cent of the desired 4,22-ergostadien-3-one and 6.5 per cent of the starting triene, as determined by ultraviolet light absorption analysis. Recrystallization or chromatographic adsorption methods yield pure diene as described in previous examples.

Example 8.—4,22-ergostadien-3-one

Using the procedure and amounts of Example 7, but with the addition of varying kinds and amounts of base, the following selective hydrogenation results are obtained. Using eighty milligrams of potassium hydroxide, the crude product contains 76 per cent of the desired 4,22-ergostadien-3-one and 9.8 per cent of the starting 4,6,22-ergostadien-3-one. Twenty milligrams of sodium hydroxide in the reaction mixture gives a crude product which contains 76.7 per cent of the desired diene and 5.6 per cent of the starting triene. Use of eighty milligrams of sodium hydroxide gives a crude product which contains 76.5 per cent of the desired diene and 2.7 per cent of the starting triene. Increasing the quantity of sodium hydroxide to 140 milligrams gives a crude product which contains 73 per cent of the desired diene and 4.2 per cent of the starting triene. In each instance the yield of crude product was approximately the theoretical amount. Purification of the crude products is accomplished as in previous examples.

Example 9.—Testosterone

Following the procedure of Example 1, 4,6-androstadien-17-ol-3-one [Wettstein, Helv. Chim. Acta, 23, 388 (1940); Meystre and Wettstein, Experientia, 2, 408 (1946)], dissolved in methanol containing potassium hydroxide, is reduced selectively with hydrogen, in the presence of five per cent palladium-charcoal catalyst, to obtain testosterone in high yield.

Example 10.—Testosterone acetate 4,6-androstadien-17-ol-3-one acetate [Wettstein, Helv. Chim. Acta, 23, 388 (1940); Meystre and Wettstein, Experientia, 2, 408 (1946)], dissolved in ethyl acetate, is reduced selectively with hydrogen, in the presence of a five per cent palladium-charcoal catalyst, using the procedure of Example 2, to obtain testosterone acetate in high yield.

Example 11.—Progesterone

Using the procedure of Example 1, the six-double bond in 4,6-pregnadien-3,20-dione [Wettstein, Helv. Chim. Acta, 23, 388 (1940); Meystre and Wettstein, Experientia, 2, 408, (1946)] is reduced selectively to obtain a high yield of progesterone.

Example 12.—4-pregnen-21-ol-3,20-dione 4,6 - pregnadien - 21 - ol - 3,20 - dione [Wettstein, Helv. Chim. Acta, 23, 388 (1940); Meystre and Wettstein, Experientia, 2, 408 (1946)] is hydrogenated selectively, according to the procedure of Example 1, to give an excellent yield of 4-pregnen-21-ol-3,20-dione.

Example 13.—4-pregnen-21-ol-3,20-dione acetate

Following the procedure of Example 2, the six-double bond in 4,6-pregnadien-21-ol-3,20-dione acetate [Wettstein, Helv. Chim. Acta, 23, 388 (1940); Meystre and Wettstein, Experientia, 2, 408 (1946)] is reduced selectively to produce a high yield of 4-pregnen-21-ol-3,20-dione acetate.

Example 14.—4-pregnen-17α,21-diol-3,11,20-trione

The six-double bond in 4,6-pregnadien-17α,21-diol-3,11,20-trione [Mattox and Kendall, J. Biol. Chem., 188, 287 (1951)] is reduced selectively, according to the procedure of Example 1, to give an excellent yield of 4-pregnen-17α,21-diol-3,11,20-trione.

Example 15.—4-pregnen-17α,21-diol-3,11,20-trione 21-acetate

Selective reduction of the six-double bond in 4,6-pregnen-17α,21-diol-3,11,20-trione 21-acetate, using the procedure of Example 2, gives 4-pregnen-17α,21-diol-3,11,20-trione 21-acetate in high yield.

Example 16.— Cholestenone 6-dehydrocholestenone [Dane, Wang, and Schulte, Z. Physiol. Chem., 245, 80 (1936)] is reduced selectively by the method of Example 1 to obtain a high yield of cholestenone.

Example 17.—11α-hydroxyprogesterone

Following the procedure of Example 1, the six-double bond in 11α-hydroxy-4,6-pregnadien-3,20-dione [Murray and Peterson, copending application Serial Number 272,944, filed February 23, 1952, Example 25] is reduced selectively to give a high yield of 11α-hydroxyprogesterone.

Example 18.—11α-acetoxyprogesterone

11α-acetoxy-4,6-pregnadien-3,20-dione [Murray and Peterson, copending application Serial Number 272,944, filed February 23, 1952, Example 25] is hydrogenated selectively, using the procedure of Example 2, to obtain a high yield of 11α-acetoxyprogesterone.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A process for the selective reduction of the six-double bond in a $\Delta^{4,6}$-3-ketosteroid, without concurrent reduction of the four-double bond and the three-keto group, which includes: treating a $\Delta^{4,6}$-3-ketosteroid, admixed with a solvent, with between about 0.9 and about 1.2 mole of hydrogen per mole of $\Delta^{4,6}$-3-ketosteroid, in the presence of a palladium catalyst, to obtain a $\Delta^4$-3-ketosteroid.

2. A process for the selective reduction of the six-double bond in a $\Delta^{4,6}$-3-ketosteroid, without concurrent reduction of the four-double bond and the three-keto group, which includes: treating a $\Delta^{4,6}$-3-ketosteroid, admixed with a solvent, with between about 0.9 and about 1.2 mole of hydrogen per mole of $\Delta^{4,6}$-3-ketosteroid, in the presence of a prereduced palladium catalyst, to obtain a $\Delta^4$-3-ketosteroid.

3. A process for the selective reduction of the six-double bond in a $\Delta^{4,6}$-3-ketosteroid, without concurrent reduction of the four-double bond and the three-keto group, which includes: treating a $\Delta^{4,6}$-3-ketosteroid, admixed with a solvent, with between about 0.9 and about 1.2 mole of hydrogen per mole of $\Delta^{4,6}$-3-ketosteroid, in the presence of a base and a prereduced palladium catalyst, to obtain a $\Delta^4$-3-ketosteroid.

4. A process for the selective reduction of the six-double bond in a $\Delta^{4,6}$-3-ketosteroid, without concurrent reduction of the four-double bond and the three-keto group, which includes: treating a $\Delta^{4,6}$-3-ketosteroid, admixed with a solvent, with between about 0.9 and about 1.2 mole of hydrogen per mole of $\Delta^{4,6}$-3-ketosteroid, in the presence of an alkali-metal hydroxide and a prereduced palladium-charcoal catalyst, to obtain a $\Delta^4$-3-ketosteroid.

5. A process for the selective reduction of the six-double bond in 4,6,22-ergostatrien-3-one, without concurrent reduction of the four and 22-double bonds and the three-keto group, which includes: treating 4,6,22-ergostatrien-3-one, admixed with a solvent, with between about 0.9 and about 1.2 mole of hydrogen per mole of 4,6,22-ergostatrien-3-one, in the presence of a palladium catalyst, to obtain 4,22-ergostadien-3-one.

6. A process for the selective reduction of the six-double bond in 4,6,22-ergostatrien-3-one, without concurrent reduction of the four and 22-double bonds and the three-keto group, which includes: treating 4,6,22-ergostatrien-3-one, admixed with a solvent, with between about 0.9 and about 1.2 mole of hydrogen per mole of 4,6,22-ergostatrien-3-one, in the presence of a prereduced palladium catalyst, to obtain 4,22-ergostadien-3-one.

7. A process for the selective reduction of the six-double bond in 4,6,22-ergostatrien-3-one, without concurrent reduction of the four and 22-double bonds and the three-keto group, which includes: treating 4,6,22-ergostatrien-3-one, admixed with a solvent, with between about 0.9 and about 1.2 mole of hydrogen per mole of 4,6,22-ergostatrien-3-one, in the presence of a base and a prereduced palladium catalyst, to obtain 4,22-ergostadien-3-one.

8. A process for the selective reduction of the six-double bond in 4,6,22-ergostatrien-3-one, without concurrent reduction of the four and 22-double bonds and the three-keto group, which includes: treating 4,6,22-ergostatrien-3-one, admixed with a solvent, with between about 0.9 and about 1.2 mole of hydrogen per mole of 4,6,22-ergostatrien-3-one, in the presence of an alkali-metal hydroxide and a prereduced palladium-charcoal catalyst, to obtain 4,22-ergostadien-3-one.

9. A process for the selective reduction of the six-double bond in 4,6,22-ergostatrien-3-one, without concurrent reduction of the four and 22-double bonds and the three-keto group, which includes: (1) admixing a palladium-charcoal catalyst with a solvent, which contains, per liter, between about 0.1 gram and about one gram of a base selected from the group consisting of sodium hydroxide and potassium hydroxide; (2) introducing hydrogen into the resulting admixture to reduce the catalyst; (3) admixing the reduced catalyst admixture with 4,6,22-ergostatrien-3-one; (4) introducing into the resulting mixture from between about 0.9 and about 1.2 mole of hydrogen per mole of 4,6,22-ergostatrien-3-one; and (5) isolating the 4,22-ergostadien-3-one produced.

10. A process for the selective reduction of the six-double bond in 4,6-androstadien-17-ol-3-one, without concurrent reduction of the four-double bond, the three-keto group, and the seventeen-hydroxyl group, which includes: treating 4,6-androstadien-17-ol-3-one, admixed with a solvent, with between about 0.9 and about 1.2 mole of hydrogen per mole of 4,6-androstadien-17-ol-3-one, in the presence of a prereduced palladium catalyst, to obtain testosterone.

11. A process for the selective reduction of the six-double bond in 4,6-pregnadien-17α,21-diol-3,11,20-trione, without concurrent reduction of the four-double bond, the seventeen and 21-hydroxyl groups, and the three, eleven, and twenty-keto groups, which includes: treating 4,6 - pregnadien - 17α,21-diol-3,11,20-trione, admixed with a solvent, with between about 0.9 and about 1.2 mole of hydrogen per mole of 4,6-pregnadien-17α,21-diol- 3,11,20-trione, in the presence of a prereduced palladium catalyst, to obtain 4-pregnen-17α,21-diol-3,11,20-trione.

12. A process for the selective reduction of the six-double bond in 6-dehydrocholestenone, without concurrent reduction of the four-double bond and the three-keto group which includes: treating 6-dehydrocholestenone, admixed with a solvent, with between about 0.9 and about 1.2 mole of hydrogen per mole of 6-dehydrocholestenone, in the presence of a prereduced palladium catalyst, to obtain cholestenone.

13. A process for the selective reduction of the six-double bond in 11α-hydroxy-4,6-pregnadien-3,20-dione, without concurrent reduction of the four-double bond, the eleven-hydroxyl group, and the three and twenty-keto groups, which includes: treating 11α-hydroxy-4,6-pregnadien-3,20-dione, admixed with a solvent, with between about 0.9 and about 1.2 mole of hydrogen per mole of 11α-hydroxy-4,6-pregnadien-3,20-dione, in the presence of a prereduced palladium catalyst, to obtain 11α-hydroxyprogesterone.

References Cited in the file of this patent

Barton, J. Chem. Soc., pp. 1771–79 (1949).
Fieser et al., Natural Products Related to Phenanthrene (1949), pp. 241 and 242.
Wieland, Annalen de Chemie, vol. 554 (1943), pp. 1–8.